(12) United States Patent
Crombez et al.

(10) Patent No.: US 9,758,129 B2
(45) Date of Patent: Sep. 12, 2017

(54) METHOD OF MINIMIZING ICE BUILDUP ON A WINDSHIELD OF A VEHICLE

(71) Applicant: FORD GLOBAL TECHNOLOGIES, LLC, Dearborn, MI (US)

(72) Inventors: Dale Scott Crombez, Livonia, MI (US); Peter Francis Worrel, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 18 days.

(21) Appl. No.: 14/920,460

(22) Filed: Oct. 22, 2015

(65) Prior Publication Data

US 2017/0113654 A1  Apr. 27, 2017

(51) Int. Cl.
| | | |
|---|---|---|
| B60R 22/00 | (2006.01) | |
| B60S 1/08 | (2006.01) | |
| B60R 16/023 | (2006.01) | |

(52) U.S. Cl.
CPC .......... *B60S 1/0818* (2013.01); *B60R 16/023* (2013.01); *B60S 1/0896* (2013.01)

(58) Field of Classification Search
USPC .......................................................... 701/49
See application file for complete search history.

(56) References Cited

U.S. PATENT DOCUMENTS

| | | | |
|---|---|---|---|
| 5,010,289 A | 4/1991 | Takada | |
| 7,783,400 B1 * | 8/2010 | Zimler | B60S 1/026 219/202 |
| 8,941,344 B2 * | 1/2015 | Wilson | B60S 1/0818 318/34 |
| 2004/0021575 A1 * | 2/2004 | Oskorep | B60S 1/026 340/601 |
| 2007/0241612 A1 * | 10/2007 | Jacoby | B60S 1/0818 307/9.1 |

FOREIGN PATENT DOCUMENTS

| | | |
|---|---|---|
| DE | 19936277 A | 2/2001 |
| DE | 102013010151 A1 | 3/2014 |

OTHER PUBLICATIONS

Halfbakery: Frost prevention wipers http://www.halfbakery.com/idea/Frost_20prevention_20wipers 1/1 Jan. 7, 2015.
English machine translation of DE102013010151.
English machine translation of DE19936277.

* cited by examiner

*Primary Examiner* — Tyler Paige
(74) *Attorney, Agent, or Firm* — Jason C. Rogers; King & Schickli, PLLC

(57) ABSTRACT

A method of minimizing ice buildup on a windshield of a vehicle is provided. The method includes the steps of: (a) monitoring a state of the vehicle; (b) determining a state of the windshield wiper; (c) determining an ambient temperature of the vehicle; and (d) initiating a timer when the state of the vehicle changes from an on state if the ambient temperature is below a threshold temperature and the state of the windshield wiper prior to the vehicle changing to the off state is an on state, and turning the windshield wiper to the on state after a period of time. The windshield wiper may remain on at least through a full cycle from a park zone, to a fully extended position, and back to the park zone. The wiper may remain on for a predetermined period of time determined based upon the ambient temperature or other condition.

20 Claims, 4 Drawing Sheets

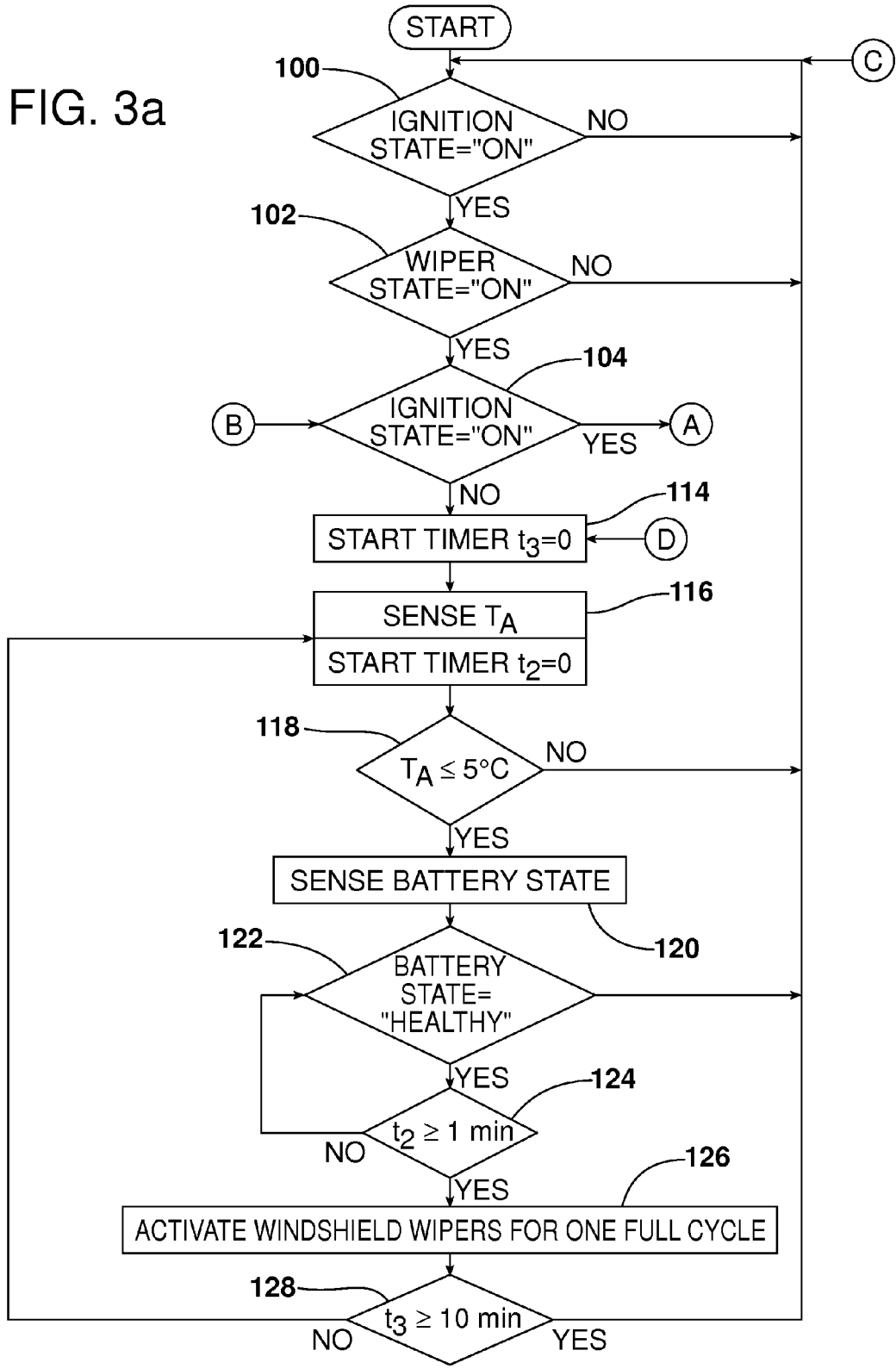

METHOD OF MINIMIZING ICE BUILDUP ON A WINDSHIELD OF A VEHICLE

TECHNICAL FIELD

This document relates generally to windshields, and more specifically to a method of minimizing ice buildup on a windshield of a vehicle.

BACKGROUND

It is well known that windshield wipers can become stuck, or frozen, to a vehicle windshield in certain inclement weather. Vehicle operators who park their vehicles outdoors at night or during the day often find their vehicle covered in snow and/or ice. In these situations, the vehicle operator will have to clear the windshield and physically move the windshield wiper to overcome the retentive force created by the snow and/or ice. In addition to being a nuisance for the vehicle operator, physically moving the windshield wiper can also result in damage to the windshield wiper or wiper blades.

In other scenarios, the vehicle owner may start the vehicle allowing it time to warm up and at least partially clear the windshield. This may be done utilizing a remote vehicle start function or manually. In such scenarios, the vehicle operator often turns on a rear window heater and a defroster to warm the front windshield. Typically, however, the vent through which the warm air blows onto the front windshield in the defrost mode contacts the window above a zone of the windshield where the windshield wipers typically reside when not in use. In other words, the defroster only warms a portion of the windshield excluding a windshield wiper park zone. In order to overcome such scenarios, mechanisms have been developed to warm the windshield wiper park zone. These mechanisms are limited primarily to a pre-warming sequence or a sequence which remains on throughout the entire time the vehicle is running.

While these mechanisms have proven useful in certain scenarios to warm the windshield wiper park zone sufficient to release the windshield wipers from the windshield, it would be preferred to minimize, if not eliminate, the buildup of ice and snow on the windshield and/or prevent the windshield wiper from freezing to the windshield altogether.

Accordingly, a need exists for a way to limit the buildup of ice and snow on the windshield and to prevent a windshield wiper from freezing to a windshield. Ideally, this can be accomplished by turning the windshield wipers on after the vehicle has been turned off in order to clear the windshield of melted ice and snow which is subject to re-freezing once the vehicle is turned off. The windshield wiper could be turned on and off intermittently or operated normally for a period of time depending on various conditions associated with the vehicle or until a temperature of the windshield reaches a temperature below freezing at which no further melting, subject to re-freezing, will occur.

SUMMARY OF THE INVENTION

In accordance with the purposes and benefits described herein, a method is provided of minimizing ice buildup on a windshield of a vehicle. The method may be broadly described as comprising the steps of: monitoring a state of the vehicle, determining a state of a windshield wiper, determining an ambient temperature of the vehicle; and initiating a timer when the state of the vehicle changes from an on state to an off state if the determined ambient temperature is below a threshold temperature and the determined state of the windshield wiper prior to the state of the vehicle changing from the on state to the off state is an on state, and turning the windshield wiper to the on state after a period of time.

In one possible embodiment, the windshield wiper remains in the on state at least through a full cycle of the windshield wiper from a park zone, to a fully extended position, and back to the park zone.

In another possible embodiment, the period of time is determined dependent upon at least one of the ambient temperature and a state of a battery supplying power to the windshield wiper.

In still another possible embodiment, the steps of initiating a timer and turning the windshield wiper to the on state after the period of time are repeated throughout a predetermined period of time. In yet another possible embodiment, the predetermined period of time is determined based upon the ambient temperature.

In another possible embodiment, the predetermined period of time is adjusted dependent upon a state of a battery supplying power to the windshield wiper.

In still another possible embodiment, the windshield wiper remains in the on state until the windshield wiper is at least partially through a full cycle of the windshield wiper from a park zone, to a fully extended position, and back to the park zone, such that the windshield wiper is not in the park zone when the state of the windshield wiper changes from the on state to an off state.

In still yet another possible embodiment, the state of the windshield wiper is determined by monitoring the windshield wiper, monitoring onboard precipitation sensors, or acquiring weather information from a remote source.

In another possible embodiment, the ambient temperature of the vehicle is determined by monitoring the ambient temperature, monitoring onboard rain sensors, or acquiring weather information from a remote source.

In one other possible embodiment, the steps of initiating a timer and turning the windshield wiper to the on state after the period of time are repeated throughout a predetermined period of time. In another, the predetermined period of time is determined based upon the ambient temperature.

Another possible method of minimizing ice buildup on a windshield of a vehicle may be broadly described as comprising the steps of: monitoring a state of the vehicle; sensing an ambient temperature of the vehicle; and turning the windshield wiper to an on state a period of time after the state of the vehicle changes from an on state to an off state if the sensed ambient temperature is below a threshold temperature when the state of the vehicle changes from the on state to the off state.

In another possible embodiment, the method further includes the step of turning the windshield wiper to an off state after at least a partial cycle of the windshield wiper from a park zone, to a fully extended position, and back to the park zone. In yet another, the step of turning the windshield wiper to the off state occurs when the windshield wiper is not in the park zone.

In still another possible embodiment, the steps of turning the windshield wiper to the on state after the period of time and turning the windshield wiper to the off state after at least a partial cycle of the windshield wiper are repeated throughout a predetermined period of time.

In yet another possible embodiment, the predetermined period of time is determined based upon at least one of the sensed ambient temperature, a state of the windshield wiper prior to the state of the vehicle changing from the on state to the off state, and a state of a battery supplying power to the windshield wiper.

In one other possible embodiment, the step of turning the windshield wiper to an on state a period of time after the state of the vehicle changes from an on state to an off state occurs only if a state of the windshield wiper is an on state prior to the state of the vehicle changing from the on state to the off state.

In another possible embodiment, a circuit for minimizing ice buildup on a windshield of a vehicle may be broadly described as comprising a temperature sensor for sensing an ambient temperature of a vehicle; a windshield wiper switch for controlling a state of the windshield wiper; an ignition switch for controlling a state of the vehicle; a control module for receiving an output of said temperature sensor indicative of the ambient temperature of the vehicle, wherein the windshield wiper switch, responsive to said control module, switches power from a battery to the windshield wiper when the state of the vehicle changes from an on state to an off state if the sensed ambient temperature is below a threshold temperature and the state of the windshield wiper prior to the state of the vehicle changing from the on state to the off state is an on state.

In another possible embodiment, the circuit further includes a high voltage battery, and a converter for recharging the battery providing power to said windshield wiper.

In other possible embodiments, the circuits for minimizing ice buildup on a windshield described above are incorporated into a vehicle.

In the following description, there are shown and described several embodiments of a method of minimizing ice buildup on a windshield of a vehicle and a related circuit. As it should be realized, the methods and systems are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle, circuits, and method and together with the description serve to explain certain principles thereof. In the drawing figures:

FIG. 3a is a flow chart schematic for minimizing ice buildup on a windshield of a vehicle;

FIG. 3b is a continuation of the flow chart schematic in FIG. 3a.

Reference will now be made in detail to the present preferred embodiments of the method of minimizing ice buildup on a windshield of a vehicle and related circuits, examples of which are illustrated in the accompanying drawing figures, wherein like numerals are used to represent like elements.

DETAILED DESCRIPTION

Figure 1:
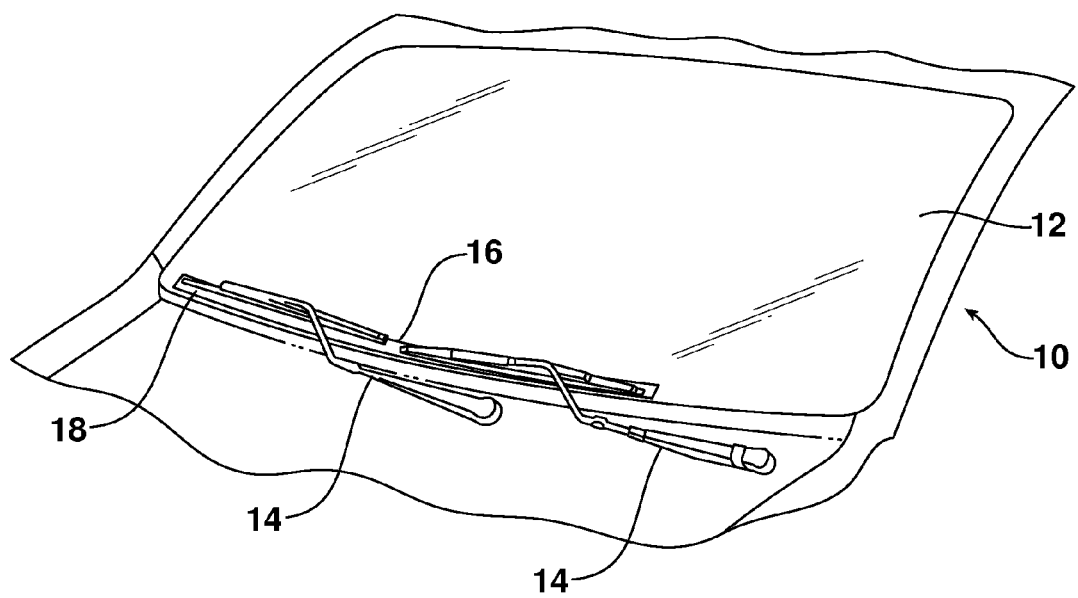
FIG. 1 is a is partial perspective view of a vehicle showing a windshield and a pair of windshield wipers positioned in a non-use or parked position.

Reference is now made to FIG. 1 which illustrates a partial vehicle 10 and a windshield 12. A pair of windshield wipers 14 are shown in a non-use or parked position. In this position, the windshield wipers 14 are in an "OFF" state. That is to say, power is not applied to the windshield wipers whether in a slow, intermittent, fast or any other mode of operation. Although a pair of windshield wipers are used in the described embodiment, other embodiments could use one or more than two windshield wipers. Also shown is a windshield wiper park zone 16 of the windshield 12. The windshield wiper park zone 16 is an area where the windshield wipers 14 generally reside in the "OFF" state of the windshield wipers.

Figure 2:
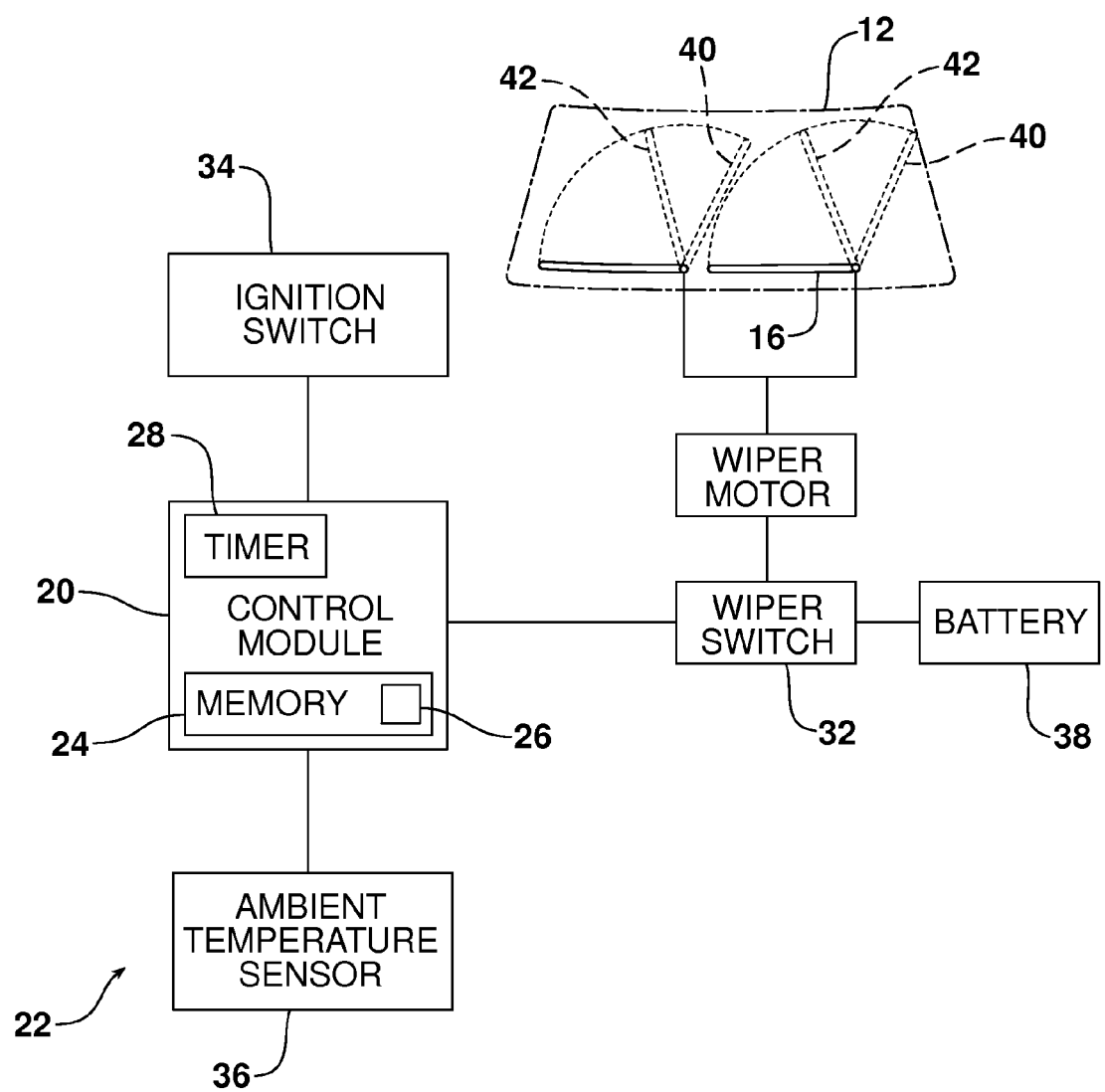
FIG. 2 is a is a block diagram of an exemplary circuit including a climate control module for minimizing ice buildup on a windshield of a vehicle.

FIG. 2 is a schematic diagram of an exemplary control circuit 22, including a control module 20, for minimizing ice buildup on the windshield 12 of the vehicle 10 thereby preventing the windshield wipers 14 from freezing to the windshield. In the described embodiment, the control module 20 is a climate control module of the vehicle 10. As shown, the control module 20 includes a memory 24 wherein a windshield wiper control program 26 is stored, and an internal timer 28. The timer 28 is utilized to determine elapsed times, among other tasks, as will be described in more detail below. Such elapsed times, predetermined periods of time, and/or temperature set points (e.g., five degrees Celsius) described herein are configurable and may be changed during the manufacturing process, or in possible alternate embodiments by the vehicle owner.

In the described embodiment, five degrees Celsius is considered near an ambient temperature where freezing on the windshield may occur. However, other temperatures could be utilized and the temperature is configurable and may be changed during the manufacturing process, or in possible alternate embodiments by the vehicle owner. In addition, the control module 20 may also filter the sensed ambient temperature through algorithms designed to correct possible inaccuracies. The sensed ambient temperature could include inaccuracies due to positioning the temperature sensor 36 within an engine compartment or other factors.

In the exemplary control circuit 22, the control module 20 continuously monitors a windshield wiper switch 32 to determine an "ON" and an "OFF" state of the windshield wipers 14. Depending on the state of the windshield wipers 14, the control module 20 further monitors an ignition switch 34 and an output ($T_A$) of a temperature sensor 36 to determine an ambient temperature of the vehicle 10. The control module 20 monitors these items directly in the described embodiment, but may monitor them indirectly via a second or third control module communicating to the first control module via a controller area network or CAN bus.

In other embodiments, the ambient temperature sensor output ($T_A$) may be obtained by the control module 20 continuously rather than in response to certain events. For example, the temperature sensor output ($T_A$) could be obtained continuously and utilized when requested by the windshield wiper control program 26. Even more, the state of the windshield wipers 14 may alternately be determined by monitoring onboard precipitation sensors, or by acquiring weather related information from a remote source (e.g., acquiring information via the internet in internet connected vehicles). Similarly, the ambient temperature may alternately be determined by monitoring onboard rain sensors, or by acquiring weather related information from a remote source (e.g., acquiring information via the internet in internet connected vehicles).

In the described embodiment, the control circuit 22 continuously monitors the state of the windshield wipers 14 via the windshield wiper switch 18. When the state of the windshield wipers 14 changes from an "ON" state to an "OFF" state, timer 28 is initiated and maintains a time ($t_1$) during which the windshield wipers remain in the "OFF" state. If the windshield wipers 14 have not been utilized, i.e., the wipers remain in the "OFF" state, for longer than a period of time ($P_1$) when the state of the ignition changes from an "ON" state wherein the vehicle is running, to an "OFF" state wherein the vehicle turned off, then no action to minimize ice buildup on the windshield 12 is taken by the control module 20.

If the state of the windshield wipers 14 is "ON" when the state of the ignition changes from the "ON" state to the "OFF" state or if the period of time ($P_1$) during which the windshield wipers remain in the "OFF" state is less than 5 minutes, for example, then an ambient temperature ($T_A$) of the vehicle 10 is sensed by temperature sensor 36. In alternate embodiments, the period of time ($P_1$) could be any period of time or the period of time could depend on the sensed ambient temperature ($T_A$) and/or a state of a battery 38 supplying power via switch 32 to the windshield wipers 14. If the ambient temperature ($T_A$) is less than five degrees Celsius, then the control module 20 initiates steps to minimize ice buildup on the windshield 12 of the vehicle 10.

These steps include switching the state of the windshield wipers 14 from the "OFF" state to the "ON" state. Rather than immediately turning the windshield wipers 14 to the "ON" state, the control module 20 waits for a period of time ($P_2$) before initiating windshield wiper action. In the described embodiment, the period of time ($P_2$) is predetermined by the manufacturer. In alternate embodiments, the period of time ($P_2$) may vary depending on the sensed ambient temperature ($T_A$) and/or a state of a battery 38 supplying power via switch 32 to the windshield wipers 14.

The windshield wipers 14 remain in the "ON" state at least through a full cycle of the windshield wiper from the park zone 16, to a fully extended position 40, and back to the park zone. In the described embodiment, the control module 20 changes the state of the windshield wipers 14 from the "ON" state to the "OFF" state at the completion of one full cycle. In alternate embodiments, the control module 20 may change the state of the windshield wipers 14 after two or more full cycles. As indicated above, the number of cycles is configurable and may be changed during the manufacturing process, or in possible alternate embodiments by the vehicle owner.

In another alternate embodiment, the control module 20 may change the state of the windshield wipers 14 from the "ON" state to the "OFF" state at any point such that the windshield wipers are not in the park zone 16. In other words, the windshield wipers 14 remain in the "ON" state until the windshield wipers are at least partially through a full cycle of the windshield wiper from the park zone 16, to the fully extended position 40, and back to the park zone 16. In this manner, the windshield wipers 14 are not in the park zone when the state of the windshield wiper changes from the "ON" state to the "OFF" state. One exemplary partially extended position 42 is shown in FIG. 2.

In the described embodiment, the state of the windshield wipers 14 is periodically changed from "OFF" to "ON" allowing the windshield wipers to operate through a full cycle throughout an overall period of time ($P_3$). Timer 28 of control module 20 monitors both the period of time ($P_2$) between activations of the windshield wipers 14 and the overall period of time ($P_3$). The overall period of time ($P_3$) is a predetermined period in the described embodiment. For example, the control module 20 may activate the windshield wipers 14 for one full cycle after every minute, i.e., $P_2$ is one minute, of a ten minute period, i.e., $P_3$ is ten minutes. Once the predetermined period of time ($P_3$) ends, the control module ceases the periodic activation of the windshield wipers.

In alternate embodiments, the period of time ($P_2$) and/or predetermined period of time ($P_3$) could be any period of time or the period of time could be dependent upon the ambient temperature ($T_A$) and/or a state of the battery 38. For example, if the ambient temperature were to rise above a temperature wherein freezing was unlikely to occur, windshield wiper utilization could be stopped prior to the end of the predetermined period of time ($P_3$). Again, the periods ($P_2$) and ($P_3$) are configurable and may be changed during the manufacturing process, or in possible alternate embodiments by the vehicle owner. As an added measure of minimizing ice buildup on the windshield 12, the control module 20 may continue to periodically operate the windshield wipers 14 for an additional number of cycles or for an additional period of time after the ambient temperature ($T_A$) rises above the threshold temperature.

As mentioned, the state of the battery 38 is considered throughout the process in order to prevent depletion of the energy stored in the battery. In one alternate embodiment, the vehicle may be an electric or hybrid vehicle equipped with a high voltage battery. In this scenario, the battery supplying power to the windshield wipers may be recharged using the high voltage battery and a DC/DC converter when the vehicle is in the "OFF" state. In this manner, the actions taken to minimize ice buildup on the windshield 12 can continue to fruition.

Figure 3B:
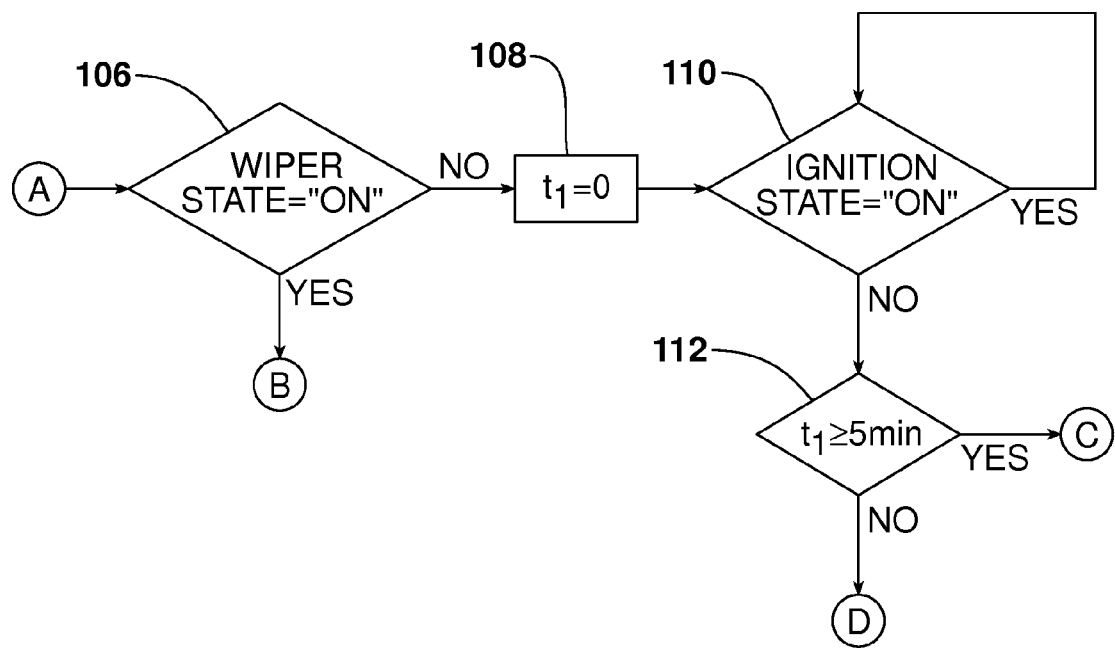

The steps utilized in one embodiment of the invention will now be described with reference to Figure. FIG. 3 is a flowchart of operational control of the control circuit 22 of the vehicle 10 according to the embodiment. The processing sequence related to operational control according to the embodiment is executed by a processor (not shown) of control module 20 as a program 26 stored in memory 24.

Upon initiation of the sequence, an "ON" or "OFF" state of the ignition switch 34 is determined at Step 100 in FIG. 3a. If the ignition switch 34 is in the "OFF" state, then the processing sequence loops back and again determines an "ON" or "OFF" state of the ignition switch 34 at Step 100. This loop continues until the ignition switch 34 is determined to be in the "ON" state. With the vehicle running or in an "ON" state, the control module 20 determines an "ON" or "OFF" state of the windshield wiper switch 32, i.e., an "ON" or "OFF" state of the windshield wipers 14, at Step 102. If the windshield wipers 14 are not in an "ON" state, the sequence returns to Step 100 ensuring that the ignition switch remains in an "ON" state until the windshield wipers are in an "ON" state.

If the windshield wipers 14 are in an "ON" state, then the "ON" or "OFF" state of the ignition switch 34 is again determined at Step 104. If the ignition switch 34 is in the "ON" state, then control module 22 again determines an "ON" or "OFF" state of the windshield wipers 14 at Step 106 shown in FIG. 3b. This monitoring loop continues until the windshield wipers 14 are determined to be in an "OFF" state prior to the ignition switch 34 being determined to be in the "OFF" state.

When the ignition switch 34 is in the "ON" state and the state of the windshield wipers 14 changes from the "ON" state to the "OFF" state as determined in Step 106, a timer 28 within the control module 20 is initiated setting time ($t_1$) to zero at step 108. Thereafter, at Step 110, the control module 20 again determines an "ON" or "OFF" state of the ignition switch 34. If the state of the ignition switch 34 remains "ON" at Step 110, then the sequence loops back to Step 110 and continuously monitors the state of the ignition switch 34 until a change occurs.

If the state of the ignition switch 34 changes to the "OFF" state at Step 110, then the control module 20 determines at Step 112 whether a period of time (designated $P_1$ above) (e.g., five minutes in the described embodiment), has elapsed since the state of the windshield wipers 14 changed to the "OFF" state prior to the ignition switch 34 changing to an "OFF" state. In other words, the control module 20 determines, at Step 112, whether the time $t_1$ is greater than or equal to five minutes. If so, then activation of the windshield wipers 14 is not required to minimize freezing in accordance with the invention and the sequence returns to Step 100 shown in FIG. 3a.

If the time $t_1$ is less than or equal to five minutes, i.e., the windshield wipers 14 were turned off less than five minutes before the vehicle was turned off, then activation of the windshield wipers 14 is desired to minimize freezing. At Step 114, shown in FIG. 3a, a timer 28 within the control module 20 is initiated setting a third time ($t_3$) to zero for monitoring a third period of time ($P_3$). The third predetermined period of time ($P_3$), in the described embodiment, represents a predetermined overall period time the control module 20 periodically changes the state of the windshield wipers 14 allowing the windshield wipers to operate throughout the overall period of time ($P_3$).

At Step 116, the control module 20 determines an ambient temperature ($T_A$) sensed by temperature sensor 36 and the control module 20 initiates the timer 28 setting a second time ($t_2$) to zero for monitoring a second period of time ($P_2$). The second period of time ($P_2$), in the described embodiment, represents a period time the control module 20 waits before activation of the windshield wiper 14 as described above.

At Step 118, the control module 20 determines whether the sensed ambient temperature ($T_A$) is less than or equal to five degrees Celsius. If the sensed ambient temperature ($T_A$) is not less than or equal to five degrees Celsius, then activation of the windshield wipers 14 is not required to minimize freezing in accordance with the invention and the sequence returns to Step 100. If the sensed ambient temperature ($T_A$) is less than or equal to five degrees Celsius at Step 118, then activation of the windshield wipers 14 is desired to minimize freezing.

Prior to activation of the windshield wipers at Step 126, however, the control module 20 determines a state of the battery 38 providing power to the windshield wipers 14 at Step 120. If the state of the battery 38 is determined not to be "HEALTHY," i.e., battery power is low, at Step 122, then the control module 20 will prevent activation of the windshield wipers 14 in order to preserve the remaining power of the battery 38, and the sequence returns to Step 100.

If the state of the battery 38 is determined to be "HEALTHY," i.e., battery power is normal, at Step 122, then the control module 20 determines whether time $t_2$ is greater than or equal to one minute. In other words, the control module 20 determines whether one minute has elapsed since the state of the engine was determined to have changed from "ON" to "OFF," at Step 124. If not, then the processing sequence loops back to Step 122 ensuring a "HEALTHY" state of the battery 38 until time $t_2$ is determined to be greater than or equal to one minute at Step 124.

If time $t_2$ is greater than or equal to one minute, then the control module 20 activates the windshield wipers 14 for one full cycle at Step 126. As described above, one full cycle of the windshield wipers 14 includes movement from the park zone 16, to the fully extended position 40, and back to the park zone 16. After completion of the full cycle, the windshield wipers 14 are turned off. As described above, multiple full cycles of the windshield wipers 14 may be utilized in alternate embodiments and/or partial cycles or combinations of full and partial cycles.

After the windshield wipers 14 are turned off, the control module 20 determines, at Step 128, whether time $t_3$ is greater than or equal to a predetermined period of time (designated $P_3$ above) (e.g., ten minutes in the described embodiment). If not, then the sequence is returned to Step 116 where the control module 20 again determines whether the sensed ambient temperature ($T_A$) is less than or equal to five degrees Celsius, resets time $t_2$ of timer 28 to zero, and initiates another timing sequence. In other words, the control module 20 activates the windshield wipers 14 for one full cycle after every minute, i.e., $P_2$ is one minute, of a ten minute period, i.e., $P_3$ is ten minutes.

At Step 118, the control module 20 again determines whether the sensed ambient temperature ($T_A$) is less than or equal to five degrees Celsius indicating whether activation of the windshield wipers 14 is required to minimize freezing. If activation of the windshield wipers 14 is required, the control module 20 ensures the health of the battery 38 at Steps 120 and 122 prior to determining at Step 124 whether the requisite one minute period of time has passed, i.e., whether time $t_2$ is greater than or equal to one minute, since the last windshield wiper activation before activating the windshield wipers 14 a second time at Step 124. These Steps 116-126 are repeated until the time $t_3$ is determined at Step 128 to be greater than or equal to ten minutes.

In other words, the windshield wipers 14 are activated at Step 126 for a full cycle. If the period of time ($P_3$) since the engine was turned to the "OFF" state is less than ten minutes, then the control module 20 ensures that the ambient temperature ($T_A$) is below the five degrees Celsius threshold where ice buildup is a concern and that the battery 38 has sufficient power to activate the windshield wipers 14 before reactivating the windshield wipers 14. Even more, the control module 20 ensures that an additional one minute period has elapsed between windshield wiper activations. After the ten minute period ($P_3$) has been determined to have elapsed at Step 128, the control module 20 ceases further activation of the windshield wipers 14 and resumes monitoring of the "ON" and "OFF" status of the vehicle 10 at Step 100.

In summary, numerous benefits result from the method of minimizing ice buildup on a windshield of a vehicle as illustrated in this document. The method is capable of minimizing ice buildup on a windshield and clearing ice and snow therefrom when the vehicle is parked and turned off, and an ambient temperature of the vehicle is near or below freezing.

The foregoing has been presented for purposes of illustration and description. It is not intended to be exhaustive or to limit the embodiments to the precise form disclosed. Obvious modifications and variations are possible in light of the above teachings. For example, the temperature set points, periods of time, and predetermined periods of time can each be adjusted at the manufacturing stage or by the vehicle operator. All such modifications and variations are within the scope of the appended claims when interpreted in accordance with the breadth to which they are fairly, legally and equitably entitled.

What is claimed:

1. A method of minimizing ice buildup on a windshield of a vehicle, comprising the steps of:
    monitoring a state of the vehicle;
    determining a state of a windshield wiper;
    determining an ambient temperature of the vehicle;

initiating a timer when the state of the vehicle changes from an on state to an off state if the determined ambient temperature is below a threshold temperature and the state of the windshield wiper prior to the state of the vehicle changing from the on state to the off state is an on state; and turning the windshield wiper to the on state after a period of time.

2. The method of minimizing ice buildup on a windshield of a vehicle of claim 1, wherein the windshield wiper remains in the on state at least through a full cycle of the windshield wiper from a park zone, to a fully extended position, and back to the park zone.

3. The method of minimizing ice buildup on a windshield of a vehicle of claim 2, wherein the period of time is determined dependent upon at least one of the ambient temperature and a state of a battery supplying power to the windshield wiper.

4. The method of minimizing ice buildup on a windshield of a vehicle of claim 2, wherein the steps of initiating a timer and turning the windshield wiper to the on state after the period of time are repeated throughout a predetermined period of time.

5. The method of minimizing ice buildup on a windshield of a vehicle of claim 4, wherein the predetermined period of time is determined based upon the ambient temperature.

6. The method of minimizing ice buildup on a windshield of a vehicle of claim 5, wherein the predetermined period of time is adjusted dependent upon a state of a battery supplying power to the windshield wiper.

7. The method of minimizing ice buildup on a windshield of a vehicle a vehicle of claim 1, wherein the windshield wiper remains in the on state until the windshield wiper is at least partially through a full cycle of the windshield wiper from a park zone, to a fully extended position, and back to the park zone, such that the windshield wiper is not in the park zone when the state of the windshield wiper changes from the on state to an off state.

8. The method of minimizing ice buildup on a windshield of a vehicle of claim 1, wherein the state of the windshield wiper is determined by monitoring the windshield wiper, monitoring onboard precipitation sensors, or acquiring weather information from a remote source.

9. The method of minimizing ice buildup on a windshield of a vehicle of claim 1, wherein the ambient temperature of the vehicle is determined by monitoring the ambient temperature, monitoring onboard rain sensors, or acquiring weather information from a remote source.

10. The method of minimizing ice buildup on a windshield of a vehicle of claim 7, wherein the steps of initiating a timer and turning the windshield wiper to the on state after the period of time are repeated throughout a predetermined period of time.

11. The method of minimizing ice buildup on a windshield of a vehicle of claim 10, wherein the predetermined period of time is determined based upon the ambient temperature.

12. A method of minimizing ice buildup on a windshield of a vehicle, comprising the steps of:
monitoring a state of the vehicle;
sensing an ambient temperature of the vehicle;
turning the windshield wiper to an on state a period of time after the state of the vehicle changes from an on state to an off state if the sensed ambient temperature is below a threshold temperature when the state of the vehicle changes from the on state to the off state.

13. The method of minimizing ice buildup on a windshield of a vehicle of claim 12, further comprising the step of turning the windshield wiper to an off state after at least a partial cycle of the windshield wiper from a park zone, to a fully extended position, and back to the park zone.

14. The method of minimizing ice buildup on a windshield of a vehicle of claim 13, wherein the step of turning the windshield wiper to the off state occurs when the windshield wiper is not in the park zone.

15. The method of minimizing ice buildup on a windshield of a vehicle of claim 12, wherein the steps of turning the windshield wiper to the on state after the period of time and turning the windshield wiper to the off state after at least a partial cycle of the windshield wiper are repeated throughout a predetermined period of time.

16. The method of minimizing ice buildup on a windshield of a vehicle of claim 15, wherein the predetermined period of time is determined based upon at least one of the sensed ambient temperature, a state of the windshield wiper prior to the state of the vehicle changing from the on state to the off state, and a state of a battery supplying power to the windshield wiper.

17. The method of minimizing ice buildup on a windshield of a vehicle of claim 12, wherein the step of turning the windshield wiper to an on state a period of time after the state of the vehicle changes from an on state to an off state occurs only if a state of the windshield wiper is an on state prior to the state of the vehicle changing from the on state to the off state.

18. A circuit for minimizing ice buildup on a windshield of the vehicle comprising:
a temperature sensor for sensing an ambient temperature of a vehicle;
a windshield wiper switch for controlling a state of the windshield wiper;
an ignition switch for controlling a state of the vehicle; and
a control module for receiving an output of said temperature sensor indicative of the ambient temperature of the vehicle,
wherein said windshield wiper switch, responsive to said control module, switches power from a battery to said windshield wiper a period of time after the state of the vehicle changes from an on state to an off state if the sensed ambient temperature is below a threshold temperature and the state of the windshield wiper prior to the state of the vehicle changing from the on state to the off state is an on state.

19. The circuit for minimizing ice buildup on a windshield of a vehicle of claim 18, further comprising a high voltage battery, and a converter for recharging said battery providing power to said windshield wiper.

20. A vehicle incorporating the circuit for minimizing ice buildup on a windshield of claim 18.

* * * * *